Patented Mar. 4, 1930

1,749,210

UNITED STATES PATENT OFFICE

HERBERT H. DOW AND EDWIN O. BARSTOW, OF MIDLAND, MICHIGAN, ASSIGNORS TO THE DOW CHEMICAL COMPANY, OF MIDLAND, MICHIGAN, A CORPORATION OF MICHIGAN

UTILIZATION OF DOLOMITE OR MAGNESIAN LIMESTONE FOR PRODUCTION OF METALLIC MAGNESIUM, ETC.

No Drawing. Application filed October 30, 1926. Serial No. 145,376.

This invention relates more particularly to the production of magnesium metal from magnesium chloride by molten bath electrolysis, and it is among the objects of the invention to provide improved procedure involving the use of magnesium chloride and dolomite, and in a manner effective and minimizing waste. Other objects and advantages will appear as the description proceeds.

To the accomplishment of the foregoing and related ends, the invention, then, consists of the features hereinafter fully described, and particularly pointed out in the claims, the following description setting forth in detail but one of the various modes in which the principle of the invention may be employed.

In proceeding in accordance with our invention, magnesium chloride is electrolyzed in molten bath, and the hot chlorine given off is cooled by drawing off in a current of air. Sulphur dioxide is admixed and the mingled gases are subjected to the action of water, for instance in a scrubber-tower or the like, and the acid liquor obtained, after recycling through the tower if desired, is mixed with an aqueous solution of calcium chloride, preferably that obtained as hereinafter. This provides a further component of hydrochloric acid, (eliminating the sulphuric acid), and this is now reacted upon dolomite, thus forming magnesium chloride and calcium chloride. These are separated in any suitable manner, the detail being immaterial to the present process, and the magnesium chloride is turned back to the electrolytic cell, while the calcium chloride is mixed with the acid liquor from the tower as above mentioned.

In this way, the electrolytic cell may be continuously operated, the dolomite effecting the regeneration and supply of magnesium chloride to the cell in continuous cycle, the magnesium being taken off, and chlorine being directed into the cycle by being combined with the magnesium content of the dolomite, the magnesium chloride thence going back to the cell, as seen. As a result, the cyclic process may be maintained in a practically self balanced manner, and even the by-product of calcium sulphate may be converted into a saleable product, while the material used in regenerating, viz the dolomite, is a relatively cheap and easily obtained source of magnesium.

While for a better understanding of the invention, the reactions concerned have been described as though distinctly separate in steps, we may where desired, in effect combine certain of these. For instance the calcium chloride may be added at the same time as sulphur dioxide or along with the water, when the chlorine and sulphur dioxide are subjected to the action of the water. Again, the dolomite may be present at the time the hydrochloric acid is reacting upon the calcium chloride, and a simultaneous reaction of the hydrochloric acid upon the dolomite may be had. In combining the steps however, the calcium sulphate produced would not be of such good commercial grade, and there would also be a tendency for calcium sulphate to form a coating on the dolomite.

Other modes of applying the principle of the invention may be employed, change being made as regards the details disclosed, provided the step or steps stated in any of the following claims or the equivalent of such be employed.

We therefore particularly point out and distinctly claim as our invention:—

1. A cyclic process of making magnesium and magnesium chloride, which comprises subjecting magnesium chloride to electrolysis in a molten bath, converting the chlorine formed thereby into hydrochloric acid, reacting such acid upon dolomite, separating the magnesium chloride and calcium chloride thereby produced, and returning such magnesium chloride to the bath.

2. A cyclic process of making magnesium and magnesium chloride, which comprises subjecting magnesium chloride to electrolysis in a molten bath, treating the chlorine formed thereby with sulphur dioxide and water, removing sulphuric acid from the resultant acid solution by adding calcium chloride, reacting the obtained hydrochloric acid upon dolomite, separating magnesium chloride and calcium chloride formed and returning the magnesium chloride to the bath, 3. A cyclic process of making magnesium and magnesium chloride, which comprises subjecting magnesium chloride to electrolysis in a molten path, treating the chlorine formed thereby with sulphur dioxide and water, removing sulphuric acid from the resultant acid solution by adding calcium chloride, reacting the obtained hydrochloric acid upon dolomite, separating the magnesium chloride and the calcium chloride formed, returning the calcium chloride to the third step, and returning the magnesium chloride to the bath.

4. In a cyclic process of making magnesium and magnesium chloride, wherein magnesium chloride is electrolyzed to produce magnesium and chlorine, the steps which consist in converting such chlorine to hydrochloric acid and reacting with the latter upon dolomite.

5. In a cyclic process of making magnesium and magnesium chloride, wherein magnesium chloride is electrolyzed to produce magnesium and chlorine, the steps which consist in reacting such chlorine with sulphur dioxide and water, treating the resultant acid solution with calcium chloride to remove sulphuric acid and leave a solution of hydrochloric acid, and reacting with the latter upon dolomite.

6. In a cyclic process of making magnesium and magnesium chloride, wherein magnesium chloride is electrolyzed to produce magnesium and chlorine, the steps which consist in reacting such chlorine with sulphur dioxide in water, treating the resultant acid solution with calcium chloride to remove sulphuric acid and leave a solution of hydrochloric acid, reacting with the latter upon dolomite, separating magnesium chloride and calcium chloride so formed, and employing such calcium chloride to react with the acid solution in said second step.

7. In a cyclic process of making magnesium and magnesium chloride, wherein magnesium chloride is electrolyzed to produce magnesium and chlorine, the steps which consist in reacting such chlorine with sulphur dioxide and water, treating the resultant acid solution with calcium chloride to remove sulphuric acid and leave a solution of hydrochloric acid, reacting with the latter upon dolomite, separating magnesium chloride and calcium chloride formed, employing such calcium chloride to react with the acid solution in said second step, and returning the magnesium chloride to the electrolysis.

Signed by us this 22nd day of October, 1926.

HERBERT H. DOW.
EDWIN O. BARSTOW.